(12) United States Patent
Gu

(10) Patent No.: US 8,939,372 B2
(45) Date of Patent: Jan. 27, 2015

(54) MOBILE TERMINAL AND DECODING METHOD THEREOF

(75) Inventor: Jianliang Gu, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 0 days.

(21) Appl. No.: 14/110,154

(22) PCT Filed: May 3, 2012

(86) PCT No.: PCT/CN2012/075003
§ 371 (c)(1),
(2), (4) Date: Oct. 6, 2013

(87) PCT Pub. No.: WO2012/159527
PCT Pub. Date: Nov. 29, 2012

(65) Prior Publication Data
US 2014/0027517 A1   Jan. 30, 2014

(30) Foreign Application Priority Data

May 24, 2011  (CN) .......................... 2011 1 0135610

(51) Int. Cl.
*G06K 7/10* (2006.01)
*G08C 21/00* (2006.01)
*G06K 7/14* (2006.01)
*H04M 1/725* (2006.01)
*G06K 17/00* (2006.01)

(52) U.S. Cl.
CPC ......... *G06K 7/1404* (2013.01); *H04M 1/72522* (2013.01); *G06K 17/0025* (2013.01)
USPC ............. 235/462.06; 235/462.42; 235/462.11

(58) Field of Classification Search
CPC ............. G06K 7/10; G06K 7/14; G06K 5/00; G06K 9/22; G06K 19/06; G06K 15/12; G06K 9/18; G06K 9/00; G08C 21/00; G03B 7/08; G02B 26/10
USPC ............ 235/462.06, 462.11, 462.24, 462.25, 235/462.42, 462.41, 462.01
See application file for complete search history.

(56) References Cited

U.S. PATENT DOCUMENTS

| | | | |
|---|---|---|---|
| 2003/0198383 A1* | 10/2003 | Yamaguchi et al. | 382/183 |
| 2011/0285874 A1* | 11/2011 | Showering et al. | 348/231.99 |
| 2012/0173347 A1* | 7/2012 | De Almeida Neves et al. | 705/16 |
| 2013/0098992 A1* | 4/2013 | Jenrick et al. | 235/375 |
| 2013/0153661 A1* | 6/2013 | Yamaguchi | 235/462.06 |
| 2013/0170765 A1* | 7/2013 | Santos et al. | 382/255 |

FOREIGN PATENT DOCUMENTS

| | | |
|---|---|---|
| CN | 1837844 A | 9/2006 |
| CN | 1988703 A | 6/2007 |
| CN | 102270292 A | 12/2011 |

* cited by examiner

*Primary Examiner* — Edwyn Labaze
(74) *Attorney, Agent, or Firm* — Cheng-Ju Chiang

(57) ABSTRACT

A mobile terminal and a decoding method thereof are disclosed. The decoding method comprises: capturing an image of a target barcode; invoking built-in decoding software to decode the target barcode; determining whether the decoding is successful, wherein if the decoding is successful, then barcode information of the target barcode is displayed and the process ends; and otherwise, if the decoding is unsuccessful, then the target barcode is sent to a decoding server; receiving barcode information obtained by the decoding server through decoding the target barcode; and displaying the barcode information of the target barcode. In this way, the present disclosure can decode various types of barcodes quickly and effectively so that the user can be informed of the barcode information of the various types of barcodes quickly and accurately.

13 Claims, 4 Drawing Sheets

MOBILE TERMINAL AND DECODING METHOD THEREOF

FIELD OF THE INVENTION

The present disclosure generally relates to the technical field of barcode decoding, and more particularly, to a barcode decoding device in the form of a mobile terminal and a decoding method thereof.

BACKGROUND OF THE INVENTION

Generally, mobile terminals currently available in the market are not provided with functions of scanning and decoding a barcode. Although some advanced mobile terminals are equipped with cameras and decoding software, the small memory thereof makes them unable to integrate therein a large decoding database that comprises the great variety of barcodes of various versions. Therefore, it is impossible to update the decoding database of the mobile terminal in real time to cover and to decode newly emerging barcodes.

Furthermore, due to limitations of the memory size and the operation frequency of the mobile terminals, the decoding and computing capabilities of the built-in decoding software of the mobile terminals are also limited. Consequently, the decoding rate is relatively low for barcodes that are unclear, stained or deformed. This degrades the applicability of using the mobile terminals to decode barcodes in people's daily life.

Accordingly, an urgent need exists in the art to provide a solution that allows a mobile terminal to decode various types of barcodes quickly and effectively.

SUMMARY OF THE INVENTION

A primary objective of the present disclosure is to solve the technical problem that mobile terminals cannot decode various types of barcodes quickly and effectively by providing a mobile terminal and a decoding method thereof. The mobile terminal and the decoding method thereof according to the present disclosure can decode various types of barcodes quickly and effectively by means of built-in decoding software and a decoding server located at the network side.

To achieve the aforesaid objective, a technical solution of the present disclosure is to provide a decoding method for a mobile terminal, which comprises the following steps of:

capturing an image of a target barcode;
invoking built-in decoding software to decode the target barcode;
determining whether the decoding is successful, wherein if the decoding is successful, then barcode information of the target barcode is displayed, and otherwise, if the decoding is unsuccessful, then luminance information of individual points in the image of the target barcode is extracted;
determining if the luminance information of the image of the target barcode is clear, wherein if the luminance information is unclear, then it is prompted to re-capture an image of the target barcode and the process returns to the step of capturing an image of a target barcode, and otherwise, if the luminance information is clear, then the next step is executed;
processing the image of the target barcode and sending the processed image to a decoding server for decoding; and
receiving barcode information obtained by the decoding server through decoding the target barcode and displaying the barcode information.

Preferably in the decoding method for a mobile terminal, the target barcode comprises one of a one-dimensional (1D) barcode and a two-dimensional (2D) barcode.

Preferably in the decoding method for a mobile terminal, the target barcode is a paper-money barcode.

To achieve the aforesaid objective, another technical solution of the present disclosure is to provide a decoding method for a mobile terminal, which comprises the following steps of:

capturing an image of a target barcode;
invoking built-in decoding software to decode the target barcode;
determining whether the decoding is successful, wherein if the decoding is successful, then barcode information of the target barcode is displayed and the process ends, and otherwise, if the decoding is unsuccessful, then the target barcode is sent to a decoding server;
receiving barcode information obtained by the decoding server through decoding the target barcode; and
displaying the barcode information of the target barcode.

Preferably in the decoding method for a mobile terminal, the target barcode comprises one of a 1D barcode and a 2D barcode.

Preferably in the decoding method for a mobile terminal, the target barcode is a paper-money barcode.

Preferably in the decoding method for a mobile terminal, the terminal mobile triggers, by means of a keyboard, capturing of the target barcode.

Preferably in the decoding method for a mobile terminal, in the step of invoking the built-in decoding software to decode the target barcode, luminance information of individual points in the image of the target barcode is extracted, then a type of the target barcode is determined, and corresponding decoding software is invoked according to the type of the target barcode to decode the target barcode.

Preferably in the decoding method for a mobile terminal, if the built-in decoding software is unable to decode the target barcode and the luminance information of the image of the target barcode is unclear, then it is prompted to re-capture an image of the target barcode, and then it is re-attempted to decode the target barcode by using the built-in decoding software according to the re-captured image of the target barcode; and if the built-in decoding software is unable to decode the target barcode and the luminance information of the image of the target barcode is clear, then the image of the target barcode is processed and sent to the decoding server for decoding.

To achieve the aforesaid objective, another technical solution of the present disclosure is to provide a mobile terminal, which comprises a central processing unit (CPU), an image capturing module, a storage module, a display module and a radio frequency (RF) module. The CPU is electrically connected with the image capturing module, the storage module, the display module and the RF module; the storage module has decoding software for decoding stored therein; and the mobile terminal connects to a peripheral decoding server via the RF module. The CPU controls the image capturing module to capture an image of a target barcode to be decoded, and decodes the target barcode by means of the decoding software. If the decoding is successful, then barcode information of the target barcode is sent to the display module for displaying; and otherwise, if the decoding is unsuccessful, then the target barcode is sent by the RF module to the decoding server for decoding, and then the barcode information obtained by the decoding server through decoding is sent back to the display module for displaying.

Preferably, the mobile terminal further comprises a keyboard, and the mobile terminal triggers the CPU by means of the keyboard so that the CPU controls the image capturing module to begin capturing the image of the target barcode.

Preferably in the mobile terminal, the target barcode is a paper-money barcode.

Preferably in the mobile terminal, the RF module connects to the decoding server via one of a wireless wide area network (WWAN), a wireless local area network (WLAN), and a combination thereof.

The present disclosure has the following benefits: as compared to the prior art, the present disclosure captures an image of the target barcode, and then decodes the target barcode by means of built-in decoding software, and if the decoding is unsuccessful, then the target barcode is decoded by a decoding server located at the network side. Thereby, the mobile terminal and the decoding method of the present disclosure can decode various types of barcodes quickly and effectively so that the user can be informed of barcode information of the various types of barcodes quickly and accurately.

DETAILED DESCRIPTION OF THE INVENTION

Figure 1:
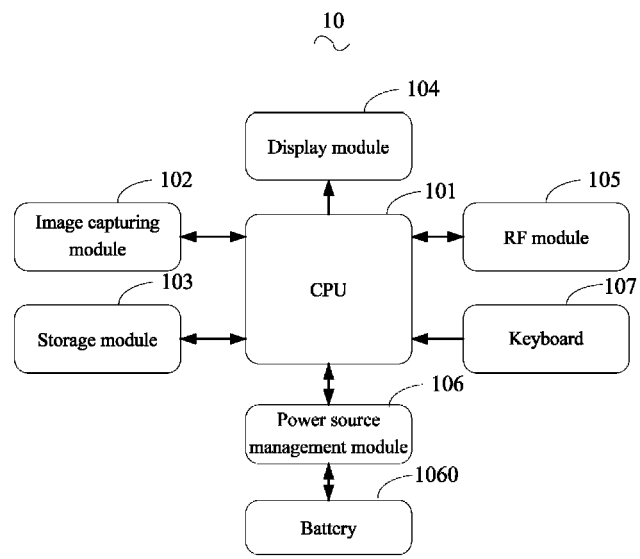
FIG. 1 is a schematic view illustrating connections between functional modules of a mobile terminal according to the present disclosure.

Referring to FIG. 1, there is shown a schematic view illustrating connections between functional modules of a mobile terminal according to the present disclosure.

The mobile terminal 10 of the present disclosure comprises a central processing unit (CPU) 101, an image capturing module 102, a storage module 103, a display module 104, a radio frequency (RF) module 105, a power source management module 106 and a key pad 107. The mobile terminal 10 of the present disclosure is a mobile terminal based on a cloud computing system.

The CPU 101 is configured to control and manage operations of the image capturing module 102, the storage module 103, the display module 104, the RF module 105, the power source management module 106 and the key pad 107. The CPU 101 controls operations of the image capturing module 102 according to operations performed on the keyboard 107, and can invoke information stored in the storage module 103 as needed. Also, the CPU 101 can control the displaying operations of the display module 104 and control the RF module 105 to transmit and receive RF signals.

The image capturing module 102, which is electrically connected to the CPU 101, is configured to capture an image. In the present disclosure, the image capturing module 102 is configured to capture an image of a target barcode to obtain feature information of a two-dimensional pattern of the target barcode and send the feature information to the CPU 101 for processing. Then, the CPU 101 invokes the decoding software in the storage module 103 to decode the feature information. The decoding software comprises a decoding algorithm and a decoding database. Also, the CPU 101 can control the image capturing module 102 to repeat the image capturing operation several times so that quality of the image captured by the image capturing module 102 can be guaranteed.

The storage module 103, which is electrically connected with the CPU 101, is configured to store decoding software necessary for decoding. The decoding software built in the mobile terminal 10 may be downloaded into the mobile terminal 10 early in the manufacturing process, and may also be updated automatically in use depending on the practical needs. The decoding software stored in the storage module 103 can be repeatedly invoked by the CPU 101.

The display module 104, which is electrically connected with the CPU 101, is configured to display information under the control of the CPU, for example, display the barcode information that is successfully decoded and display error prompts about the image captured. In the present disclosure, the barcode information used to display the target barcode that has been successfully decoded may comprise data, truth and false determination or the like.

The RF module 105, which is electrically connected with the CPU 101, connects to a peripheral device (e.g., a server such as a decoding server) via a communication network. The RF module 105 connects to the communication network via a wireless wide area network (WWAN), a wireless local area network (WLAN), or a combination of WWAN and WLAN. An output end of the RF module 105 may include a Bluetooth (BT) antenna, a Global Positioning System (GPS) antenna or the like. The communication network is just a network environment in which the mobile terminal operates, including a WWAN or a WLAN. The CPU 101 controls the RF module 105 to send the image of the target barcode and receive the barcode information of the target barcode from the decoding server.

The power source management module 106, which is electrically connected with the CPU 101, comprises a battery 1060 connected with the power source management module 106. The power source management module 106 is responsible for distributing a working voltage supplied by the battery 1060 or some other devices to individual functional modules and ensuring proper operating voltages of the functional modules. The battery 1060 is responsible for supplying the operating voltages necessary for operation of the mobile terminal.

The keyboard 107, which is electrically connected with the CPU 101, is just a common keyboard generally used in mobile terminals. In this embodiment, the user can trigger the CPU 101 by means of the keyboard 107, and then the CPU 101 controls the image capturing module 102 to begin image capturing of the target barcode. Of course, in case of a mobile terminal that supports a touch screen, the user may also trigger the CPU 101 through a touch.

The functional modules of the mobile terminal 10 can be assembled into the mobile terminal 10 of the present disclosure through a general assembling process.

Figure 2:
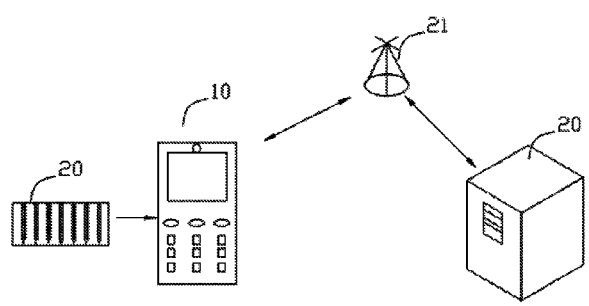
FIG. 2 is a schematic view illustrating information interactions in operation of the mobile terminal shown in FIG. 1.

Referring to FIG. 2, there is shown a schematic view illustrating information interactions in operation of the mobile terminal shown in FIG. 1.

The decoding process of the mobile terminal of the present disclosure involves a target barcode 20, the mobile terminal 10, a communication network 21 and a decoding server 22. The mobile terminal 10 captures an image of the target barcode 20, and then decodes the target barcode 20 by means of the built-in decoding software or processes the target barcode 20 and then sends the processed target barcode 20 via the communication network 21 to the decoding server 22 for decoding. If the decoding is successful, the target barcode is displayed by the mobile terminal. Decoding software of the decoding server 22 is updated in real time and keeps online. A decoding database and a decoding algorithm included in the decoding software of the decoding server 22 can meet the decoding requirements of various mobile terminals and various types of barcodes to the greatest extent as possible.

Hereinbelow, a decoding method for a mobile terminal according to the present disclosure will be further described with reference to embodiments thereof so as to make the present disclosure easy to understand.

Figure 3:
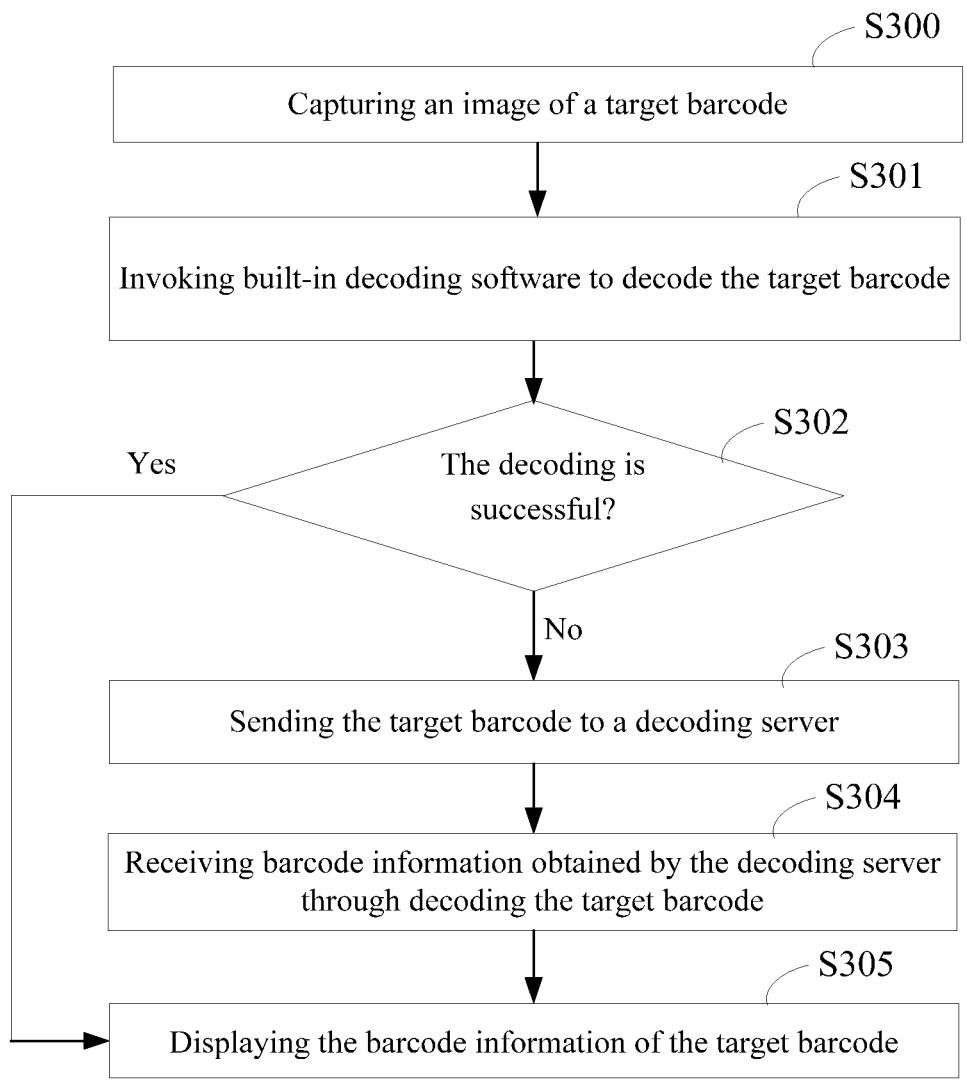
FIG. 3 is a schematic flowchart diagram of an embodiment of a decoding method for a mobile terminal according to the present disclosure.
Figure 4:
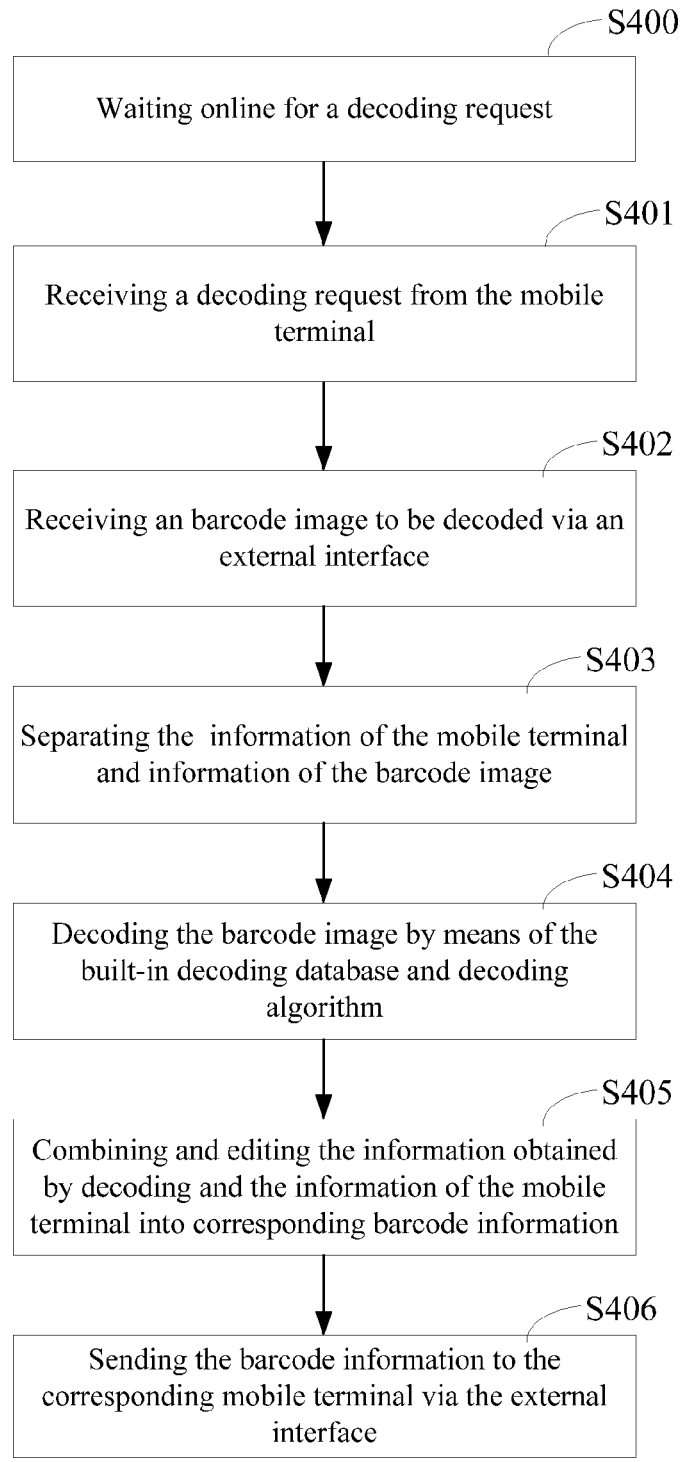
FIG. 4 is a schematic flowchart diagram illustrating operations of a decoding server in the decoding method for a mobile terminal shown in FIG. 3.

Referring to FIG. 3 and FIG. 4, FIG. 3 is a schematic flowchart diagram of an embodiment of a decoding method for a mobile terminal according to the present disclosure, and FIG. 4 is a schematic flowchart diagram illustrating operations of a decoding server in the decoding method for a mobile terminal shown in FIG. 3.

Step S300: capturing an image of the target barcode 20;

Step S301: invoking built-in decoding software to decode the target barcode 20;

Step S302: determining whether the decoding is successful, wherein if the decoding is successful, then step S305 is executed, and otherwise, step S303 is executed;

Step S303: sending the target barcode 20 to a decoding server 22;

Step S304: receiving barcode information obtained by the decoding server 22 through decoding the target barcode 20;

Step S305: displaying the barcode information of the target barcode.

When it is desired to decode the target barcode 20, the user may trigger the CPU 101 by means of the keyboard 107 so that the CPU 101 controls the image capturing module 102 to capture an image of the target barcode 20.

The target barcode 20 may be a one-dimensional (1D) barcode or a two-dimensional (2D) barcode; and specifically, the target barcode 20 may be a paper-money barcode or some other type of identification code, for example, an anti-counterfeit label.

When the built-in decoding software is invoked for decoding purpose, luminance information of individual points in the image of the target barcode 20 is extracted firstly, then a type of the target barcode 20 is determined, and corresponding decoding software is invoked according to the type of the target barcode 20 to decode the target barcode 20.

Additionally, if, when the mobile terminal 10 attempts to decode the target barcode 20 by itself, the built-in decoding software is unable to decode the target barcode 20 and the luminance information of the image of the target barcode 20 is unclear, then it is prompted to re-capture an image of the target barcode, and then it is re-attempted to decode the target barcode 20 by using the built-in decoding software according to the re-captured image of the target barcode 20; and if the built-in decoding software is unable to decode the target barcode 20 and the luminance information of the image of the target barcode 20 is clear, then the image of the target barcode 20 is processed and sent to the decoding server 22 for decoding.

Referring to FIG. 4 again, the decoding process of the decoding server 22 includes but is not limited to:

Step S400: waiting online for a decoding request;

Step S401: receiving a decoding request from the mobile terminal;

Step S402: receiving an barcode image to be decoded via an external interface (e.g., Ethernet, WWAN or WLAN);

Step S403: separating the information of the mobile terminal and information of the barcode image;

Step S404: decoding the barcode image by means of built-in software;

Step S405: combining and editing the information obtained by decoding and the information of the mobile terminal into corresponding barcode information; and Step S406: sending the barcode information to the corresponding mobile terminal via the external interface.

For detailed operations, please refer back to the decoding method for a mobile terminal shown in FIG. 3, and no limitation is made herein.

Figure 5:
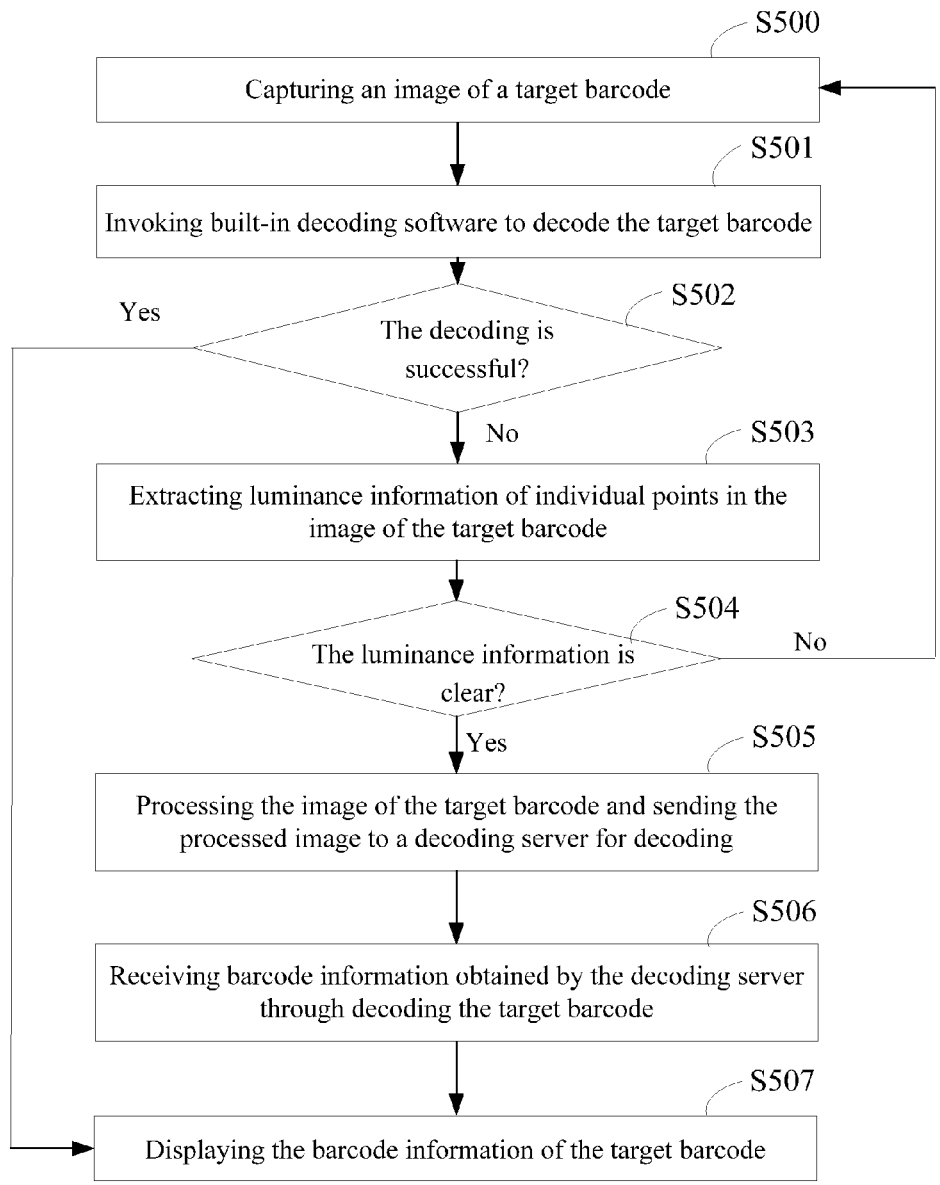
FIG. 5 is a schematic flowchart diagram of another embodiment of the decoding method for a mobile terminal according to the present disclosure.

Referring to FIG. 5, there is shown a schematic flowchart diagram of another embodiment of the decoding method for a mobile terminal according to the present disclosure. In this embodiment, the decoding method comprises:

Step S500: capturing an image of a target barcode;

Step S501: invoking built-in decoding software to decode the target barcode;

Step S502: determining whether the decoding is successful, wherein if the decoding is successful, then step S507 is executed, and otherwise, step S503 is executed;

Step S503: extracting luminance information of individual points in the image of the target barcode;

Step S504: determining if the luminance information of the image of the target barcode is clear, wherein if the luminance information is unclear, then it is prompted to re-capture an image and the process returns to the step S500; and otherwise, if the luminance information is clear, then step S505 is executed;

Step S505: processing the image of the target barcode and sending the processed image to a decoding server for decoding;

Step S506: receiving barcode information obtained by the decoding server through decoding the target barcode; and Step S507 displaying the barcode information of the target barcode.

Through the aforesaid operations, the mobile terminal and the decoding method thereof according to the present disclosure can intelligently identify a type of a target barcode and conditions of an image and, according to this, choose to decode the target barcode by means of the built-in decoding software or the decoding server, and also can decode various kinds of barcodes. Thereby, the mobile terminal of the present disclosure can decode a barcode quickly and effectively to satisfy the demands for modern scientific and technological development.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A decoding method for a mobile terminal, comprising the following steps of:

capturing an image of a target barcode;

invoking built-in decoding software to decode the target barcode;

determining whether the decoding is successful, wherein if the decoding is successful, then barcode information of the target barcode is displayed, and otherwise, if the decoding is unsuccessful, then the next step is executed;

extracting luminance information of individual points in the image of the target barcode;

determining if the luminance information of the image of the target barcode is clear, wherein if the luminance information is unclear, then it is prompted to re-capture an image of the target barcode and the process returns to the step of capturing an image of a target barcode; and otherwise, if the luminance information is clear, then the next step is executed;

processing the image of the target barcode and sending the processed image to a decoding server for decoding;

receiving barcode information obtained by the decoding server through decoding the target barcode; and displaying the barcode information of the target barcode.

2. The decoding method for a mobile terminal of claim 1, wherein the target barcode comprises one of a one-dimensional (1D) barcode and a two-dimensional (2D) barcode.

3. The decoding method for a mobile terminal of claim 1, wherein the target barcode is a paper-money barcode.

4. A decoding method for a mobile terminal, comprising the following steps of:

capturing an image of a target barcode;

invoking built-in decoding software of the mobile terminal to decode the whole target barcode for obtaining barcode information of the target barcode;

determining whether the decoding is successful, wherein if the decoding is successful, then the barcode information of the target barcode is displayed and the process ends; and otherwise, if the decoding is unsuccessful, then the target barcode is sent to a decoding server and following steps are performed;

receiving barcode information obtained by the decoding server through decoding the target barcode; and displaying the barcode information of the target barcode.

5. The decoding method for a mobile terminal of claim 4, wherein the target barcode comprises one of a 1D tone-dimensional) barcode and a 2D (two-dimensional) barcode.

6. The decoding method for a mobile terminal of claim 4, wherein the target barcode is a paper-money barcode.

7. The decoding method for a mobile terminal of claim 4, wherein the terminal mobile triggers, by means of a keyboard, capturing of the target barcode.

8. The decoding method for a mobile terminal of claim 4, wherein in the step of invoking the built-in decoding software to decode the target barcode, luminance information of individual points in the image of the target barcode is extracted, then a type of the target barcode is determined, and corresponding decoding software is invoked according to the type of the target barcode to decode the target barcode.

9. The decoding method for a mobile terminal of claim 8, wherein if the built-in decoding software is unable to decode the target barcode and the luminance information of the image of the target barcode is unclear, then it is prompted to re-capture an image of the target barcode, and then it is re-attempted to decode the target barcode by using the built-in decoding software according to the re-captured image of the target barcode; and if the built-in decoding software is unable to decode the target barcode and the luminance information of the image of the target barcode is clear, then the image of the target barcode is processed and sent to the decoding server for decoding.

10. A mobile terminal, comprising a central processing unit (CPU), an image capturing module, a storage module, a display module and a radio frequency (RF) module, wherein the CPU is electrically connected with the image capturing module, the storage module, the display module and the RF module, the storage module has decoding software for decoding stored therein, and the mobile terminal connects to a peripheral decoding server via the RF module;

the CPU controls the image capturing module to capture an image of a target barcode to be decoded, and decodes the whole target barcode to obtain barcode information of the target barcode by means of the decoding software stored in the storage module of the mobile terminal, and if the decoding is successful, then the barcode information of the target barcode is sent to the display module for displaying, and otherwise, if the decoding is unsuccessful, then the target barcode is sent by the RF module to the peripheral decoding server for decoding, and then the barcode information obtained by the decoding server through decoding is sent back to the display module for displaying.

11. The mobile terminal of claim 10, further comprising a keyboard, wherein the mobile terminal triggers the CPU by means of the keyboard so that the CPU controls the image capturing module to begin capturing the image of the target barcode.

12. The mobile terminal of claim 10, wherein the target barcode is a paper-money barcode.

13. The mobile terminal of claim 10, wherein the RF module connects to the decoding server via one of a wireless wide area network (WWAN), a wireless local area network (WLAN), and a combination thereof.

* * * * *